(12) United States Patent
Anin et al.

(10) Patent No.: US 12,184,905 B2
(45) Date of Patent: Dec. 31, 2024

(54) CENTRALIZED CONTENT MODERATION IN LIVE STREAMING MEDIA COMMUNICATION

(71) Applicant: TangoMe, Inc, Mountain View, CA (US)

(72) Inventors: Artem Anin, Petersburg (RU); Daniil Shvets, Givatayim (IL); Eli Baskin, Hod Hasharon (IL)

(73) Assignee: TangoMe, Inc, Mountain View, CA (US)

( * ) Notice: Subject to any disclaimer, the term of this patent is extended or adjusted under 35 U.S.C. 154(b) by 8 days.

(21) Appl. No.: 18/166,587

(22) Filed: Feb. 9, 2023

(65) Prior Publication Data

US 2023/0254518 A1 Aug. 10, 2023

(30) Foreign Application Priority Data

Feb. 10, 2022 (IL) .......................................... 290536

(51) Int. Cl.
- *H04N 21/2187* (2011.01)
- *G06V 20/40* (2022.01)
- *H04N 21/234* (2011.01)

(52) U.S. Cl.
CPC ......... *H04N 21/2187* (2013.01); *G06V 20/44* (2022.01); *H04N 21/23418* (2013.01)

(58) Field of Classification Search
CPC ......... H04N 21/2187; H04N 21/23418; G06V 20/44
See application file for complete search history.

(56) References Cited

U.S. PATENT DOCUMENTS

| | | |
|---|---|---|
| 10,440,324 B1 | 10/2019 | Lichtenberg |
| 10,944,805 B1 | 3/2021 | Zhong |
| 11,153,403 B1 * | 10/2021 | Yan ....................... H04L 51/212 |
| 2018/0341877 A1 | 11/2018 | Panattoni |
| 2019/0012568 A1 | 1/2019 | Kumar |
| 2019/0174202 A1 | 6/2019 | Shankar |
| 2021/0235143 A1 * | 7/2021 | Bhudavaram .... H04N 21/25883 |
| 2021/0295177 A1 | 9/2021 | Joshi |

OTHER PUBLICATIONS

IL Search Report dated Sep. 15, 2022 for corresponding IL Application No. 290536.

* cited by examiner

*Primary Examiner* — Sumaiya A Chowdhury
(74) *Attorney, Agent, or Firm* — Tarolli, Sundheim, Covell & Tummino LLP (57) ABSTRACT

There is provided a technique of a centralized content moderation in a live streaming media. The technique comprises: periodically providing content evaluation of a sample of a contributing media stream, thereby obtaining a content evaluation (CE) result characterizing the stream, wherein a periodicity of sampling is defined by a sampling rate currently defined for the stream; periodically assigning to the stream a score being a function of the CE result and being indicative of a current compliance level of the stream to the moderation policy, wherein a periodicity of assigning is defined by the sampling rate currently defined for the stream; responsive to a predefined event, calculating a cumulative stream score (CSS) of the stream, wherein the CSS is calculated as a derivative of the scores assigned to the stream during a backward window of a predefined duration; and updating the sampling rate of the stream in accordance with CSS.

18 Claims, 3 Drawing Sheets

CENTRALIZED CONTENT MODERATION IN LIVE STREAMING MEDIA COMMUNICATION

TECHNICAL FIELD

The presently disclosed subject matter relates to streaming media communication and, more particularly, to techniques of moderating live streaming media communication.

BACKGROUND

Modern live streaming media techniques allow transferring digital media between multiple end points without first being recorded and stored. It is noted that the term "live streaming media" refers to any media content delivered to any computing device(s) via a communication network (e.g. Internet) and received, in real time, for further use. Streaming media can include streaming audio, streaming video, streaming text, streaming data, streaming TV and/or other multi-media streams. Streaming media techniques are usable to present various content such as, for example, movies, television shows, sports events, news programs, live events, etc. Likewise, these techniques are usable to enable real-time operating between remote sites, interactive broadcasting, interactive real-time applications between multiple users, etc.

However, live streaming media can present concerns. The media content can include harmful material that can cause damage to recipients, particularly children and/or vulnerable people. For example, the media content can include violence, hate speech, prohibited political topics, classified information and/or other types of harmful or otherwise inappropriate content. Therefore, there is a need in continuously identifying and mitigating harmful content as it is streamed. Such task can be fulfilled with the help of content moderating techniques.

Content moderation is the practice of monitoring and evaluating compliance of a content to a certain policy and further applying, when necessary, moderation actions in accordance with the evaluation results.

Problems of content moderation in the streaming media have been recognized in the conventional art and various techniques have been developed to provide the solutions, for example:

US Patent Application No. 2019/0012568 entitled "Image Content Moderation" discloses a technique including classifying, based on a learning model, an object displayed in an image into a category. Further, image content moderation may include detecting, based on another learning model, the object, refining the detected object based on a label, and determining, based on another learning model, a category for the refined detected object. Further, image content moderation may include identifying, based on the label, a keyword associated with the object, and determining, based on the identified keyword, a category for the object. Further, image content moderation may include categorizing, based on a set of rules, the object into a category, and moderating image content by categorizing the object into a category. Yet further, image content moderation may include tagging, based on fusion-based tagging, the object with a category and a colour associated with the object.

US Patent Application No. 2021/0295177 entitled "Unified Moderation and Analysis of Content" discloses a technique of content moderation. During operation, the system identifies content shared within an online system and interactions between users of the online system and the content that match behavioural criteria and content-based criteria in a set of rules. Next, the system aggregates the content and the interactions into trends in the content and the interactions, predictions associated with the content and the interactions, and recommendations for moderating the content and the interactions. The system then outputs representations of the trends, the predictions, and the recommendations in a user interface. Finally, the system receives, via the user interface, an action to be performed on a subset of the content and updates sharing of the content within the online system based on the action.

U.S. Pat. No. 10,440,324 entitled "Altering Undesirable Communication Data for Communication Sessions" discloses techniques implemented partly by a communications service for identifying and altering undesirable portions of communication data, such as audio data and video data, from a communication session between computing devices. The communications service may stream the communication data for the communication session partly through managed servers and analyze the communication data to detect undesirable portions. The communications service may alter or remove the portions of communication data received from a first user device, such as by filtering, refraining from transmitting, or modifying the undesirable portions. The communications service may send the modified communication data to a second user device engaged in the communication session after removing the undesirable portions.

U.S. Pat. No. 10,944,805 entitled "Scalable Multi-Level Collaborative Content Moderation" discloses real-time content moderation that includes receiving, by a sending device of a sending user, a first portion of a media stream from the sending user; determining, by the sending device, that the first portion of the media stream is classified as uncertain for transmission to a receiving user; transmitting, by the sending device to a centralized content moderation device, the first portion of the media stream, where the centralized content moderation device determines a centralized determination of whether the first portion is appropriate; in response to the centralized determination indicating that the first portion is appropriate, transmitting, by the sending device to the receiving user, the first portion; and, in response to the centralized determination indicating that the first portion is inappropriate, transmitting, by the sending device to the receiving user, a blurred first portion of the first portion.

The references cited above teach background information that may be applicable to the presently disclosed subject matter. Therefore, the full contents of these publications are incorporated by reference herein where appropriate for appropriate teachings of additional or alternative details, features and/or technical background.

General Description

In accordance with certain aspects of the presently disclosed subject matter, there is provided a technique of a centralized content moderation of contributing media streams transferred from a plurality of contributing devices to a streaming platform.

In accordance with certain aspects of the presently disclosed subject matter, there is provided a method of a centralized content moderation in a live streaming media communication. The method comprises, by a computer: a) periodically providing a content evaluation of a sample of a given contributing stream, thereby obtaining a content evaluation (CE) result characterizing the given contributing stream, wherein a periodicity of sampling is defined by a sampling rate currently defined for the given stream; b) periodically assigning to the given stream a score being a function of the CE result and being indicative of a current compliance level of the given stream to the moderation policy, wherein a periodicity of assigning is defined by the sampling rate currently defined for the given stream; c) responsive to a predefined event, calculating a cumulative stream score (CSS) of the given stream, wherein the CSS is calculated as a derivative of the scores assigned to the given stream during a backward window of a predefined duration; and d) updating the sampling rate of the given contributing stream in accordance with CSS. Operations a)-d) are further repeated in accordance with the updated sampling rate.

The predefined duration of the backward window is defined so to guarantee that the window covers, in any given stream, at least one backward event of content evaluation. Optionally, the predefined duration of the backward window is equal for all contributing streams associated with accounts with the same account score and differs for the contributing streams associated with accounts with different account scores The sample can include, for example, a screenshot of a video stream, a portion of an audio stream and a streaming text, etc.

The sample can be evaluated in parallel with streaming the media to a plurality of consuming devices operatively connected to the streaming platform or the streaming can be delayed, at least, for the time of evaluation.

The content evaluation can comprise recognition, in the sample, of one or more portions of content defined as inappropriate by a moderation policy. The content evaluation can further comprise classifying the recognized inappropriate objects to define their category and/or severity level in accordance with the moderation policy. Optionally, the content evaluation of the sample can be provided with the help of one or more suitable machine-learning models trained to recognize one or more inappropriate content objects.

A content evaluation (CE) result can be informative of an event of recognizing an inappropriate content object, and/or a number of the recognized inappropriate objects, and/or categories of the recognized inappropriate objects, severity levels thereof, and/or a severity level evaluated for the entire sample, etc.

The score of a given stream can be assigned as a function of also a current score assigned to an account associated with the given stream and indicative of a current compliance level of the account to the moderation policy.

Optionally, the predefined event can be constituted by obtaining at least one of: a CE result characterizing the given stream and matching a predefined criterion, a stream score assigning to the given stream and matching a predefined criterion, a 3rd party report related to violation of the moderation policy, and a moderation action with regard to an account associated with the given stream.

Optionally, the CSS can be further used for updating the account score and/or for taking a moderation decision.

Optionally, any new stream can have the same initial sampling rate. Alternatively, an initial sampling rate of a new stream associated with an account with higher account score can have higher initial sampling rate than an initial sampling rate of a new stream associated with an account with lower account score.

In accordance with other aspects of the presently disclosed subject matter, there is provided a system capable of content moderation in a live streaming media communication, the system configured to operate in accordance with the method detailed with reference to the above aspects.

In accordance with other aspects of the presently disclosed subject matter, there are provided one or more computing devices comprising processors and memory, the one or more computing devices configured, via computer-executable instructions, to perform operations for operating, in a cloud computing environment, a system capable of a centralized content moderation in a live streaming media communication via a streaming platform operatively connected with a plurality of contributing devices transferring contributing media streams to the streaming system. The operations comprise: a. periodically providing a content evaluation for a sample of a given contributing stream, thereby obtaining a content evaluation (CE) result characterizing the given stream, wherein a periodicity of sampling is defined by a sampling rate currently defined for the given stream; b. periodically assigning to the given stream a score being a function of the CE result and being indicative of a current compliance level of the given stream to the moderation policy, wherein a periodicity of assigning is defined by the sampling rate currently defined for the given stream; c. responsive to a predefined event, calculating a cumulative stream score (CSS) of the given stream, wherein the CSS is calculated as a derivative of the scores assigned to the given stream during a backward window of a predefined duration; d. updating the sampling rate of the given stream in accordance with CSS; and e. repeating the operations a)-d) in accordance with the updated sampling rate.

The one or more computing devices can be further configured to perform operations of the method detailed with reference to the above aspects.

Among advantages of certain embodiments is capability of dynamically adjusting a sampling rate of the contributing media streams in correspondence with a continuously updated risk level of the respective streams. Among further advantages is capability of further associating the risk level of a contributing stream with a risk score of a contributor account associated thereto.

The proposed technique can improve resource management, performance and scalability of the centralized content moderation of the streaming media.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "evaluating", "sampling", "calculating", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the moderation system disclosed in the present application.

The operations in accordance with the teachings herein may be performed by a computer specially constructed for the desired purposes or by a general-purpose computer specially configured for the desired purpose by a computer program stored in a non-transitory computer-readable storage medium.

Figure 1:
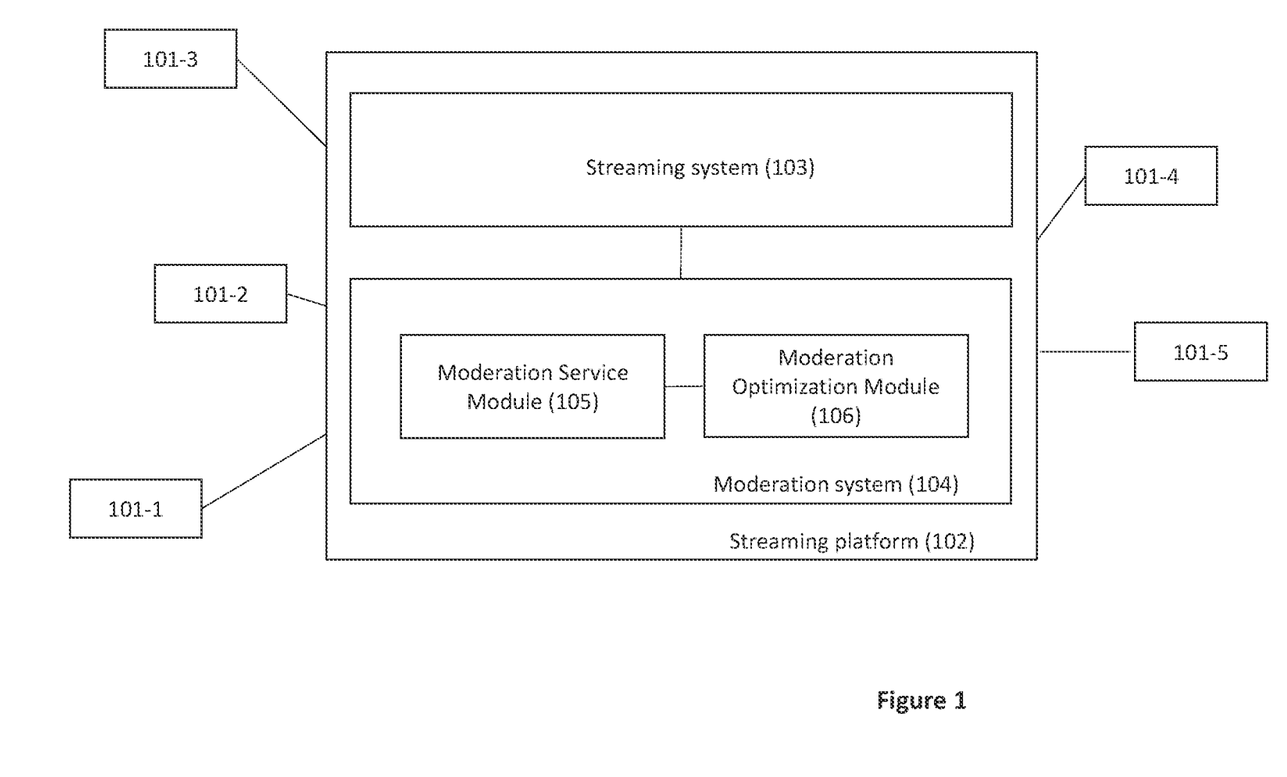
FIG. 1 illustrates a generalized block diagram of a streaming platform configured in accordance with certain embodiments of the presently disclosed subject matter.

Bearing this in mind, attention is drawn to FIG. 1 illustrating a generalized block diagram of a streaming platform configured in accordance with certain embodiments of the presently disclosed subject matter. Streaming platform 102 is operatively connected via a packet-switched communication network (not shown) with a plurality of user devices 101-1-101-5. User devices 101-1-101-5 operate as contributing devices transferring contributing media streams to streaming platform 102 and/or as consuming devices receiving consuming media streams from streaming platform 102.

Streaming platform 102 comprises a streaming system 103 operatively connected to a moderation system 104.

Streaming system 103 is configured to enable the consuming devices to select, control and receive the media streams in accordance with contributing media streams provided by the contributing devices. A contributing device can include a video and/or audio capturing device or can operate in conjunction with one or more capturing devices or other devices providing one or more media streams. A consuming device is configured to request and, accordingly, receive the streamed media from streaming system 103. The consuming device can render the received data (e.g. with a help of a media player) and/or use them for other applications.

Moderation system 104 is configured to enable moderation of content from the contributing media streams and comprises a moderation service module 105 operatively connected to a moderation optimization module 106. Moderation service module 105 is configured to provide a moderation process. The moderation process comprises, for each contributing stream, continuous sampling and evaluating (with or without human involvement) a policy compliance of the content thereof. The moderation process further comprises providing respective moderation actions (e.g. alerting or banning the contributors, content alteration, etc.) in accordance with the results of the content analyses and moderation policy. Moderation optimization module 106 is configured to optimize the moderation process as further detailed with reference to FIGS. 2-3.

It is noted that the teachings of the presently disclosed subject matter are not bound by the streaming platform described with reference to FIG. 1. Equivalent and/or modified functionality can be consolidated or divided in another manner and can be implemented in any appropriate combination of software with firmware and/or hardware and executed on one or more suitable devices. At least part of the functionality of the moderation system and/or streaming system can be implemented in a cloud and/or distributed and/or virtualized computing arrangement.

The inventors have recognized that there is a need of optimizing the moderation processes known in the art so to reduce the number of contributing streams moderated at the same point-in-time by a centralized moderation system. In accordance with certain embodiments of the presently disclosed subject matter, there is proposed a centralized moderation system that dynamically evaluates a compliance level of a given contributing stream and samples the given stream with a frequency varying in accordance with the dynamically evaluated compliance level of the stream. Further, it is proposed to dynamically evaluate a compliance level of a contributor account associated with the given contributing stream and to sample the contributing streams (including the given stream) associated with the account with a frequency varying in accordance with the dynamically evaluated compliance level of the account.

Figure 2:
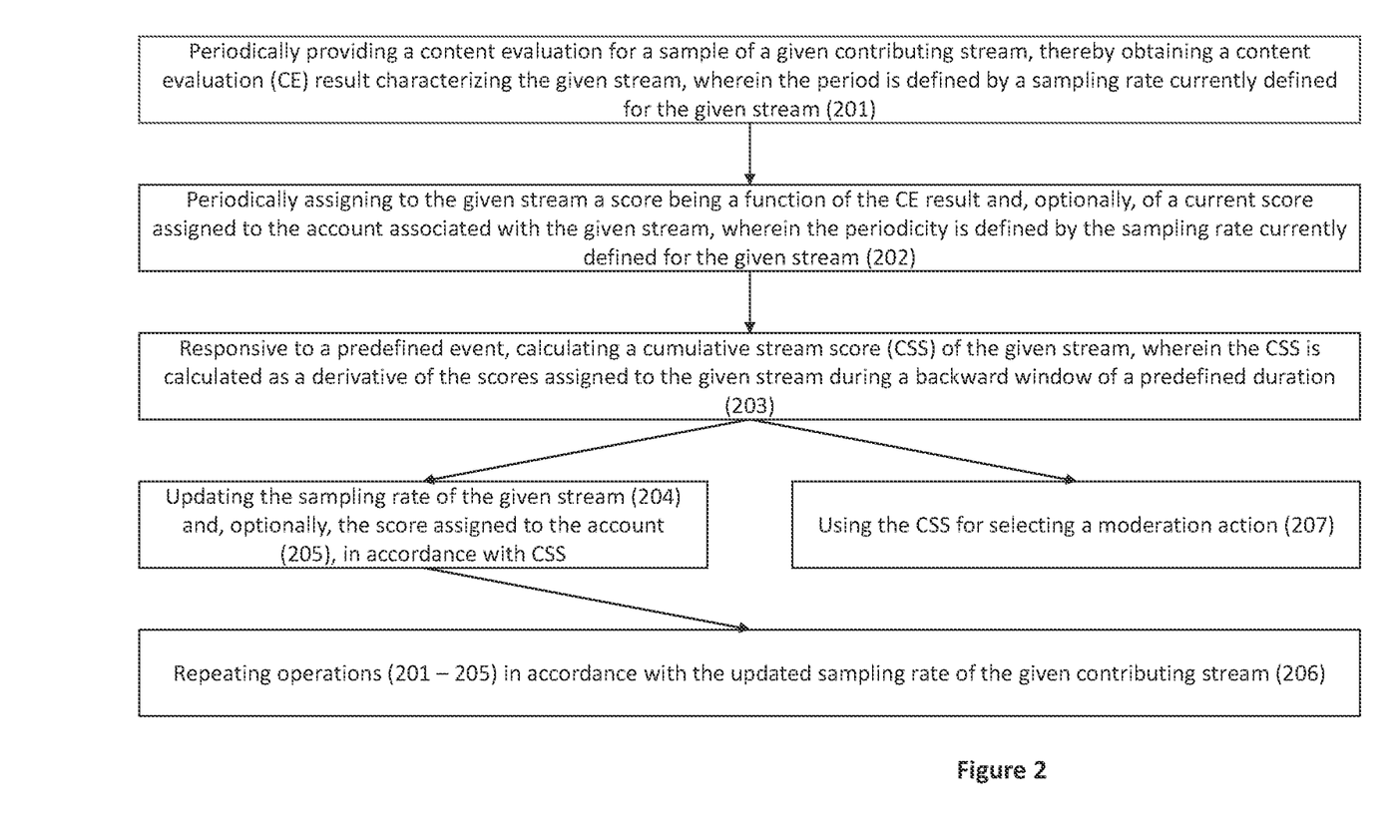
FIG. 2 illustrates a generalized flow-chart of an optimized moderation process in accordance with certain embodiments of the presently disclosed subject matter.

Referring to FIG. 2, there is illustrated a generalized flow-chart of an optimized moderation process in accordance with certain embodiments of the presently disclosed subject matter.

Moderation system 104 periodically obtains a sample of a given contributing stream and evaluates a content thereof, thereby obtaining (201) a content evaluation (CE) result characterizing the given stream. The periodicity of sampling (referred to hereinafter also as "sampling rate") is defined by a sampling rate currently defined for the given stream.

By way of non-limiting examples, the sample can include a screenshot of a video stream, a portion of an audio stream and/or of a streaming text, etc. The samples can be evaluated in parallel with streaming the media or streaming can be delayed for the time of evaluation.

The content evaluation can include recognition, in the sample, of one or more portions of content (referred to hereinafter as content objects) defined as inappropriate by a moderation policy or recognition of absence of such objects. The content evaluation can further include classifying the recognized inappropriate objects to define their category and/or severity level in accordance with the moderation policy.

By way of non-limiting example, the content evaluation of the sample can be provided with the help of any suitable machine-learning model (e.g. neural network) known in the art. Machine-learning (ML) model can be trained to recognize the inappropriate content objects. Optionally, ML model can be further trained to output a classification decision informative of a category of the recognized inappropriate object and/or the level of inappropriateness thereof. Optionally, recognition can be provided with the help of several ML models, each trained to classify different types of content objects and/or different types of policy violation. For example, one ML model can be trained to identify and classify content that depicts violent acts, while another ML model can be trained to identify and classify child abusive content, etc. Optionally, when the recognition and/or classification is uncertain, the sample can be evaluated with involvement of a human moderator.

In certain embodiments a CE result can be informative of at least one of: an event of recognizing an inappropriate content object, a number of the recognized inappropriate objects, categories of the recognized inappropriate objects, severity levels thereof (optionally, in association with confidence levels of respective classifications), a severity level evaluated for the entire sample and alike.

Moderation system 104 uses the obtained CE result to periodically assign (202) a score to the given contributing stream (referred to hereinafter as a "stream score"), the stream score is indicative of a current compliance level to the moderation policy (e.g. of risk level of violating the policy by the stream). The periodicity of assigning is defined by a sampling rate currently defined for the given contributing stream.

By way of non-limiting example, the stream score can be an integer number between 1 and 10, wherein the stream score equal to 1 corresponds to a "safe" stream, and the stream score equal to 10 corresponds to the highest risk of violating the policy by the stream.

By way of non-limiting example, the score value can be assigned by matching the obtained CE result (e.g. a number and/or category of the recognized inappropriate objects, etc.) to a predefined mapping data structure (e.g. a look-up table) configured to provide mapping between the CE results (and/or derivatives thereof) and the stream scores to be assigned. Alternatively or additionally (prior to mapping), CE result can be processed to calculate a value (referred to hereinafter as a severity value) indicative of severity of the recognized inappropriate content. For example, in certain embodiments the severity value can be calculated as a weighed sum of severity values characterizing the recognized inappropriate objects, wherein the weights (and, optionally, objects' severity values) are defined by the moderation policy in accordance with the respective objects' categories. The calculated severity value can be used for assigning the stream score.

In certain embodiments, moderation system 104 can assign (202) the stream score responsive to each content evaluation provided for the given stream. Alternatively, moderation system 104 can assign the stream score in accordance with a predefined schedule, wherein the stream score can be assigned based on all (or a part of) CE results obtained after a previous stream score assignment.

Optionally, moderation system 104 can be configured to comprise a data structure informative of contributor accounts, each account associated with a user device, a group of user devices associated with a certain user, and/or a group of user devices associated with a group of users. A contributor account can maintain account-related data informative of one or more streams contributed by the user device(s) associated with the account, such contributing streams are referred to hereinafter as associated with the account. The account-related data are continuously updated and can include historical data (and/or derivatives thereof) informative of the scores assigned to the associated streams, reports received from the consumers of the associated streams, view peak events, moderation activity with regard to the associated streams, etc.

With regard to each given contributor account, moderation system 104 can further assign an account score indicative of a current compliance level of the account to the moderation policy, and continuously (periodically and/or responsive to predefined events) update the account score in accordance with account-related data characterizing all contributing streams associated with the account. It is noted that account score depends, inter alia, on compliance levels of all streams associated thereto. By way of non-limiting example, the account score can be defined in accordance with historical data characterizing the account (e.g. account's previous scores, number of 3rd party's reports of policy violation, account's warns and shutdowns, etc.). Optionally, the score can be further weighted in consideration of similar metrics of other accounts. By way of non-limiting example, the account score can be an integer number between 1 and 10, wherein the account score equal to 1 corresponds to a "safe" account, and the account score equal to 10 corresponds to the "riskiest" account.

In accordance with certain embodiments of the presently disclosed subject matter, moderation system 104 can assign (202) a score of a given contributing stream in consideration of a current score assigned to the account associated therewith. By way of non-limiting examples, the current account score can be included as one of the parameters in the mapping data structure and/or as a coefficient or a weighed term in the calculation of the severity value of the stream.

Thus, the score of the given stream can depend on the compliance level of its associated account.

Responsive to a triggering event from one or more predefined triggering events, moderation system 104 calculates (203) a cumulative stream score (CSS) of the given stream. The CSS is calculated as a derivative (e.g. integer of the mean value, etc.) of all scores assigned to the given stream during a backwards window of a predefined duration $t_w$ (i.e. CSS is calculated as derivative of all scores corresponding to sampling the given stream during $t_w$ period prior to the triggering event).

By way of non-limiting examples, the one or more predefined triggering events can include obtaining at least one of: a CE result characterizing the given stream and matching a predefined criterion, a stream score assigned to the given stream and matching a predefined criterion, a 3rd party report related to violation of the moderation policy by the given stream and/or respective account, a moderation action with regard to account, etc.

The duration of the backward window is defined so to guarantee that the window covers, in any stream, at least one backward event of content evaluation. Accordingly, the duration of the window shall be configured to be more than the maximal time between samplings configured in the moderation system. In certain embodiments the duration of the window can be equal for all streams. In other embodiments the duration of the window can be equal for all streams with the same account score and can differ for the streams with other account scores. By way of non-limiting example the duration of the window can be configured in a range of 2.5-5 minutes.

Moderation system 104 updates (204) the sampling rate of the given contributing stream in accordance with CSS. Optionally, moderation system 104 can further use the CSS for updating (205) the respective account score (e.g. CSS can be used as a parameter for the account score calculation). Optionally, moderation system 104 can update the account score responsive to each new CSS calculated for the stream.

Moderation system 104 repeats (206) operations (201)-(205) in accordance with the updated sampling rate. Non-limiting example of sampling rates for different CSS is illustrated in Table 1.

TABLE 1

| CSS ceiling | Sampling Rate, sec |
| --- | --- |
| 2 | 150 |
| 6 | 100 |
| 11 | 80 |
| 20 | 60 |
| 50 | 30 |
| 72 | 25 |
| 105 | 20 |
| 160 | 15 |

TABLE 1-continued

| CSS ceiling | Sampling Rate, sec |
|---|---|
| 270 | 10 |
| 300 | 10 |

Moderation system 104 can use the calculated CSS for taking moderation decisions and selecting (207) the moderation actions. For example, the moderation policy can comprise a data structure mapping the moderation actions to CSS (and, optionally, to other parameters of the stream and/or associated account) of a given contributing stream. Accordingly, a moderation action with regard to the given stream and/or the associated account can be provided in accordance with such mapping.

Moderation system 104 can assign the same initial sampling rate to any new stream and further increase or decrease the sampling rate in accordance with the periodically calculated CSS. Alternatively, the initial sampling rates of the new streams can depend on the score of respective associated account. The new streams associated with accounts with higher account score can have higher initial sampling rate (optionally, still equal therebetween) than the streams associated with accounts with lower account score.

Figure 3:
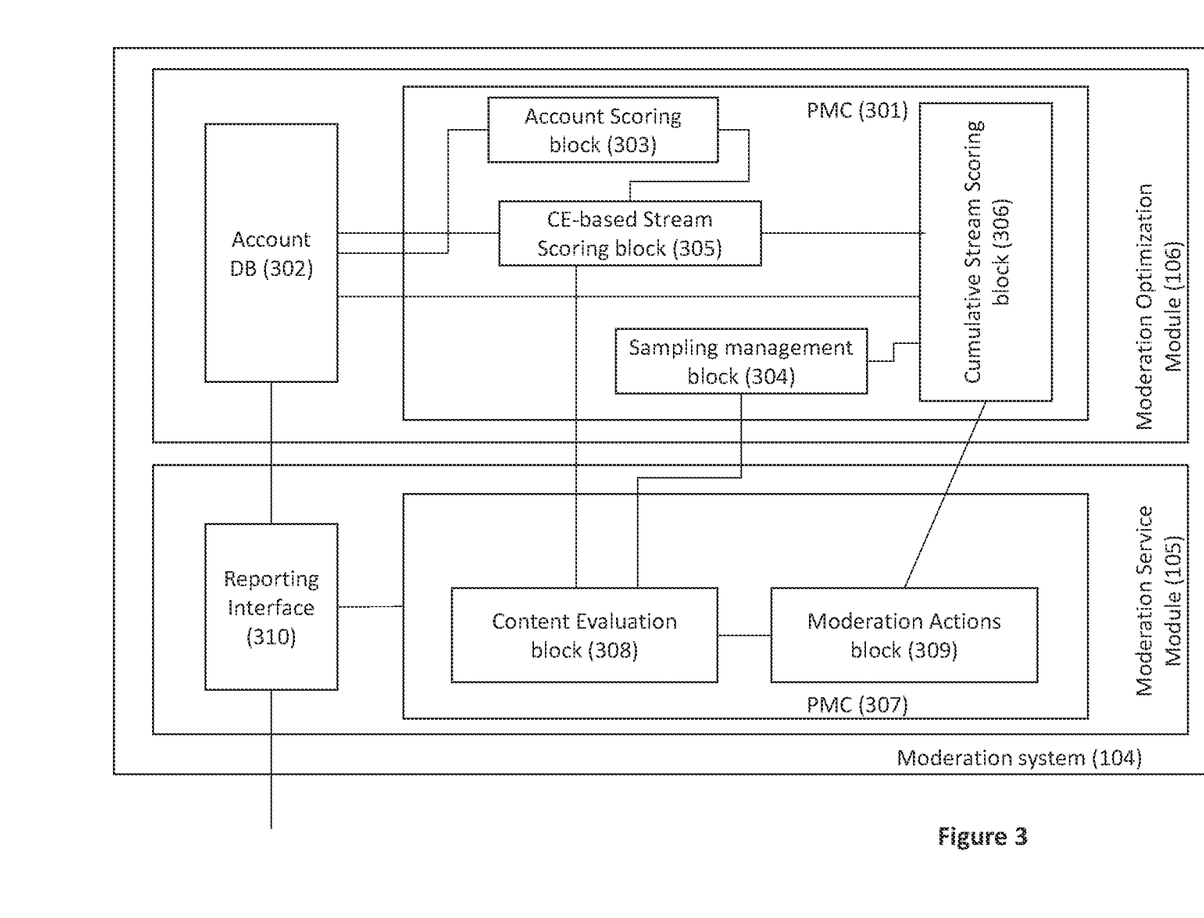
FIG. 3 illustrates a generalized block diagram of a moderation system configured in accordance with certain embodiments of the presently disclosed subject matter.

Referring to FIG. 3, there is illustrated a generalized block diagram of moderation system 104 configured in accordance with certain embodiments of the presently disclosed subject matter and operating as detailed above with reference to FIG. 2.

Moderation system 104 comprises moderation service module 105 with processing and memory circuitry (PMC) 301 and moderation optimization module 106 with PMC 307.

PMC 301 and PMC 307 are configured to execute several program components in accordance with computer-readable instructions implemented on a non-transitory computer-readable storage medium. Such executable program components are referred to hereinafter as functional blocks comprised in the PMC. The functional blocks can be implemented in any appropriate combination of software with firmware and/or hardware.

PMC 307 in moderation service module 105 comprises a content evaluation block 308 operatively connected to a moderation actions block 309. Content evaluation block 308 is configured to continuously sample the live contributing streams to recognize and evaluate inappropriate content therein. Moderation actions block 309 is configured to enable moderation actions in accordance with the CE results and/or derivatives thereof. Moderation service module 105 further comprises reporting interface 310 operatively connected to PMC 307 and enabling receiving data informative of user peak events, user reports related to the streams and/or other user-generated data. Moderation service module 105 can be further configured to enable human intervention (not shown) in the moderation process.

PMC 301 in moderation optimization module 106 comprises CE-based stream scoring block 305 operatively connected to an account scoring block 303, a sampling management block 304 and a cumulative stream scoring (CSS) block 306.

Moderation optimization module 106 further comprises account database 302 operatively connected to PMC 301 and reporting interface 310. Account database 302 is configured to maintain account-related data detailed with reference to FIG. 2, the data can be received from PMC 301 and via reporting interface 310.

Account scoring block 303 is configured to continuously define account scores using data received from account database 302.

CE-based stream scoring block 305 is configured to continuously receive, for each given stream, CE results from content evaluation block 308 and, optionally, from account scoring block 303. Stream scoring block 305 is further configured to use the received data to continuously assign the scores of a given stream and provide the assigned scores to CSS block 306. The assigned scores can be also provided to account DB 302.

CSS block 306 is configured to continuously calculate CSS of each given stream and provide the calculated CSS to sampling management block 304 and, optionally, to account DB 302. CSS block 306 can be further configured to provide the calculated CSS to moderation actions block 309, CSS to be used when taking moderation decisions.

Sampling management block 304 is configured to continuously define, for each given stream, a sampling rate corresponding to CSS thereof and to update content evaluation block 308 accordingly. Content evaluation block 308 is further configured to provide sampling of the streams with respectively updated sampling rate.

Thus, in accordance with certain embodiments of the currently presented subject matter, each given contributing stream is sampled with continuously updated sampling rate corresponding to a continuously updated risk level of the stream.

It is noted that the teachings of the presently disclosed subject matter are not bound by the moderation system described with reference to FIG. 3. Equivalent and/or modified functionality can be consolidated or divided in another manner and can be implemented in any appropriate combination of software with firmware and/or hardware.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of a centralized content moderation in a live streaming media communication via a streaming platform operatively connected with a plurality of contributing devices transferring contributing media streams to the streaming system, the method comprising:
   by a computer:

a. periodically providing a content evaluation of a sample of a given contributing media stream, thereby obtaining a content evaluation (CE) result characterizing the given contributing stream, wherein a periodicity of sampling is defined by a sampling rate currently defined for the given stream;

b. periodically assigning to the given stream a score being a function of the CE result and being indicative of a current compliance level of the given stream to the moderation policy, wherein a periodicity of assigning is defined by the sampling rate currently defined for the given stream;

c. responsive to a predefined event, calculating a cumulative stream score (CSS) of the given stream, wherein the CSS is calculated as a derivative of the scores assigned to the given stream during a backward window of a predefined duration;

d. updating the sampling rate of the given contributing stream in accordance with CSS; and e. repeating the operations a)-d) in accordance with the updated sampling rate, wherein an initial sampling rate of a new stream associated with an account with higher account score has higher initial sampling rate than an initial sampling rate of a new stream associated with an account with lower account score.

2. The method of claim 1, wherein the sample includes at least one of: a screenshot of a video stream, a portion of an audio stream and a streaming text.

3. The method of claim 1, wherein a CE result is informative of at least one of: an event of recognizing an inappropriate content object, a number of the recognized inappropriate objects, categories of the recognized inappropriate objects, severity levels thereof, and a severity level evaluated for the entire sample.

4. The method of claim 1, wherein the score of the given stream is assigned as a function of also a current score assigned to an account associated with the given stream and indicative of a current compliance level of the account to the moderation policy.

5. The method of claim 1, wherein the predefined event is constituted by obtaining at least one of: a CE result characterizing the given stream and matching a predefined criterion, a stream score assigning to the given stream and matching a predefined criterion, a 3rd party report related to violation of the moderation policy, and a moderation action with regard to an account associated with the given stream.

6. The method of claim 1, wherein the predefined duration of the backward window is defined so to guarantee that the window covers, in any given stream, at least one backward event of content evaluation.

7. The method of claim 6, wherein the predefined duration of the backward window is equal for all contributing streams associated with accounts with the same account score and differs for the contributing streams associated with accounts with different account scores.

8. The method of claim 6, further comprising using the CSS for updating the account score.

9. The method of claim 1, further comprising using the calculated CSS for taking a moderation decision.

10. The method of claim 1, wherein any new stream has the same initial sampling rate.

11. One or more computing devices comprising processors and memory, the one or more computing devices configured, via computer-executable instructions, to perform operations for operating, in a cloud computing environment, a system capable of a centralized content moderation in a live streaming media communication via a streaming platform operatively connected with a plurality of contributing devices transferring contributing media streams to the streaming system, the operations comprising:

a. periodically providing a content evaluation for a sample of a given contributing media stream, thereby obtaining a content evaluation (CE) result characterizing the given contributing stream, wherein a periodicity of sampling is defined by a sampling rate currently defined for the given stream;

b. periodically assigning to the given stream a score being a function of the CE result and being indicative of a current compliance level of the given stream to the moderation policy, wherein a periodicity of assigning is defined by the sampling rate currently defined for the given stream;

c. responsive to a predefined event, calculating a cumulative stream score (CSS) of the given stream, wherein the CSS is calculated as a derivative of the scores assigned to the given stream during a backward window of a predefined duration;

d. updating the sampling rate of the given contributing stream in accordance with CSS; and e. repeating the operations a)-d) in accordance with the updated sampling rate, wherein an initial sampling rate of a new stream associated with an account with higher account score has higher initial sampling rate than an initial sampling rate of a new stream associated with an account with lower account score.

12. The one or more computing devices of claim 11, wherein the sample includes at least one of: a screenshot of a video stream, a portion of an audio stream and a streaming text.

13. The one or more computing devices of claim 11, wherein a CE result is informative of at least one of: an event of recognizing an inappropriate content object, a number of the recognized inappropriate objects, categories of the recognized inappropriate objects, severity levels thereof, and a severity level evaluated for the entire sample.

14. The one or more computing devices of claim 11, wherein the score of the given stream is assigned as a function of also a current score assigned to an account associated with the given stream and indicative of a current compliance level of the account to the moderation policy.

15. The one or more computing devices of claim 11, wherein the predefined event is constituted by obtaining at least one of: a CE result characterizing the given stream and matching a predefined criterion, a stream score assigning to the given stream and matching a predefined criterion, a 3rd party report related to violation of the moderation policy, and a moderation action with regard to an account associated with the given stream.

16. The one or more computing devices of claim 11, wherein the predefined duration of the backward window is defined so to guarantee that the window covers, in any given stream, at least one backward event of content evaluation, wherein the predefined duration of the backward window is equal for all contributing streams associated with accounts with the same account score and differs for the contributing streams associated with accounts with different account scores.

17. The one or more computing devices of claim 11, wherein any new stream has the same initial sampling rate.

18. A non-transitory computer-readable medium comprising instructions that, when executed by a computing system comprising a memory storing a plurality of program components executable by the computing system, cause the computing system to enable a centralized content moderation in a live streaming media via a streaming platform operatively connected with a plurality of contributing devices transferring contributing media streams to the streaming system to:
  a. periodically provide a content evaluation of a sample of a given contributing media stream, thereby obtain a content evaluation (CE) result characterizing the given contributing stream, wherein a periodicity of sampling is defined by a sampling rate currently defined for the given stream;
  b. periodically assign to the given stream a score being a function of the CE result and being indicative of a current compliance level of the given stream to the moderation policy, wherein a periodicity of assigning is defined by the sampling rate currently defined for the given stream;
  c. responsive to a predefined event, calculate a cumulative stream score (CSS) of the given stream, wherein the CSS is calculated as a derivative of the scores assigned to the given stream during a backward window of a predefined duration;
  d. update the sampling rate of the given contributing stream in accordance with CSS; and
  e. repeat the operations a)-d) in accordance with the updated sampling rate, wherein an initial sampling rate of a new stream associated with an account with higher account score has higher initial sampling rate than an initial sampling rate of a new stream associated with an account with lower account score.

\* \* \* \* \*